United States Patent [19]

Oke et al.

[11] E Re. 29,603

[45] Reissued Apr. 4, 1978

[54] BUCKET REINFORCEMENT STRUCTURE

[75] Inventors: Stanley A. Oke, Batavia; Robert F. Shankwitz, Edelstein, both of Ill.

[73] Assignee: Caterpillar Tractor Co., Peoria, Ill.

[21] Appl. No.: 748,033

[22] Filed: Dec. 6, 1976

Related U.S. Patent Documents

Reissue of:

[64] Patent No.: 3,853,232
Issued: Dec. 10, 1974
Appl. No.: 287,671
Filed: Sep. 11, 1972

[51] Int. Cl.[2] ..... E02F 3/70

[52] U.S. Cl. ..... 214/145 R; 37/118 R

[58] Field of Search ..... 214/145 R, 146; 37/118 R, 118 A, 141 R; 294/70; 198/152

[56] References Cited

U.S. PATENT DOCUMENTS

| | | | |
|---|---|---|---|
| 2,597,374 | 5/1952 | Richey | 214/145 R |
| 2,722,065 | 11/1955 | Smith | 37/141 R |
| 3,056,219 | 10/1962 | Jeffrey | 214/145 R |
| 3,243,906 | 4/1966 | Washbond | 214/145 R |
| 3,398,472 | 8/1968 | Leijon | 214/145 R |
| 3,523,621 | 8/1970 | Anderson et al. | 37/118 R |
| 3,705,656 | 12/1972 | Hunger et al. | 214/145 R |

*Primary Examiner*—Drayton E. Hoffman

*Attorney, Agent, or Firm*—Wegner, Stellman, McCord, Wiles & Wood

[57] ABSTRACT

A bucket for use with a loader vehicle includes a pair of spaced reinforcement means fixed to the bottom wall portion of the bucket. Each reinforcement means defines a box section which runs transversely of the cutting edge of the bucket, including a pair of ribs which run continuously rearward from the cutting edge along the bottom wall portion and up the rear wall portion of the bucket. The ribs define first and second pairs of apertures for attaching the bucket to a loader linkage.

23 Claims, 3 Drawing Figures

BUCKET REINFORCEMENT STRUCTURE

Matter enclosed in heavy brackets [ ] appears in the original patent but forms no part of this reissue specification; matter printed in italics indicates the additions made by reissue.

BACKGROUND OF THE INVENTION

This invention relates to bucket construction, and more particularly, to box section reinforcement means in cooperation with such a bucket.

In general, a loader bucket construction commonly has the bucket shell (i.e., a bottom wall portion, a rear wall portion, and end walls), serving as both a load retaining receptacle and a structural support member. Although this construction has proven satisfactory for relativey small loaders, numerous structural failures have occured with this type bucket on the larger, higher horsepower loaders. In such cases, the width of the loader bucket has been increased to match the width of the loader, and when all the loading force is concentrated at the mid-portion of the cutting edge, deflections therein of 2 to 3 inches have been measured. Deflections of this magnitude overstress the weld joints at the points where the cutting edge is welded to the end walls or corner castings, often resulting in failure at these points. This problem is aggravated by the addition of bucket teeth which increase the chances of concentrating the load in one area.

While buckets which incorporate reinforcement structrues are known, (see, for example, U.S. Pat. No. 2,786,591 to Neumeister, U.S. Pat. No. 2,929,521 to Beyerstedt, U.S. Pat. No. 2,959,306 to Kampert, U.S. Pat. No. 3,093,917 to Schroeder, U.S. Pat. No. 3,148,792 to Granryd et al., U.S. Pat. No. 3,182,832 to Bodin, U.S. Pat. No. 3,349,934 to Moyer et al (assigned to the assignee of this application), and U.S. Pat. No. 3,398,472, to Leijon), none of these devices provides the extremely rigid construction of a reinforcement means transverse of the cutting edge and associated with that cutting edge. With such a construction, rigidity and strength of the bucket may be increased (in relation to these known prior art devices), meanwhile maintaining an extreme simplicity and economy of design.

SUMMARY OF THE INVENTION

It is therefore an object of this invention to provide a reinforcement construction for a bucket which is extremely rigid and provides proper reinforcement of the bucket in the areas where needed.

It is a further object of this invention to provide a reinforcement construction for a bucket which, while fulfilling the above object, is simple and economical in design and manufacture.

Broadly stated, the invention is in a bucket construction, having a bottom wall portion, a rear wall portion extending therefrom, a pair of end wall portions between which the rear wall and bottom wall portions extend, and a cutting edge fixed to and running along the forward edge of the bottom wall portion. Such invention comprises reinforcement means, comprising first and second rib members spaced apart and fixed externally to the bottom wall portion and running continuously from the cutting edge, and fixed relative thereto, to the rear of the bottom wall portion. A plate is fixed to the extending edges of the first and second rib members, and runs therealong, the rib members and plate together forming a box section running transversely of the cutting edge.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
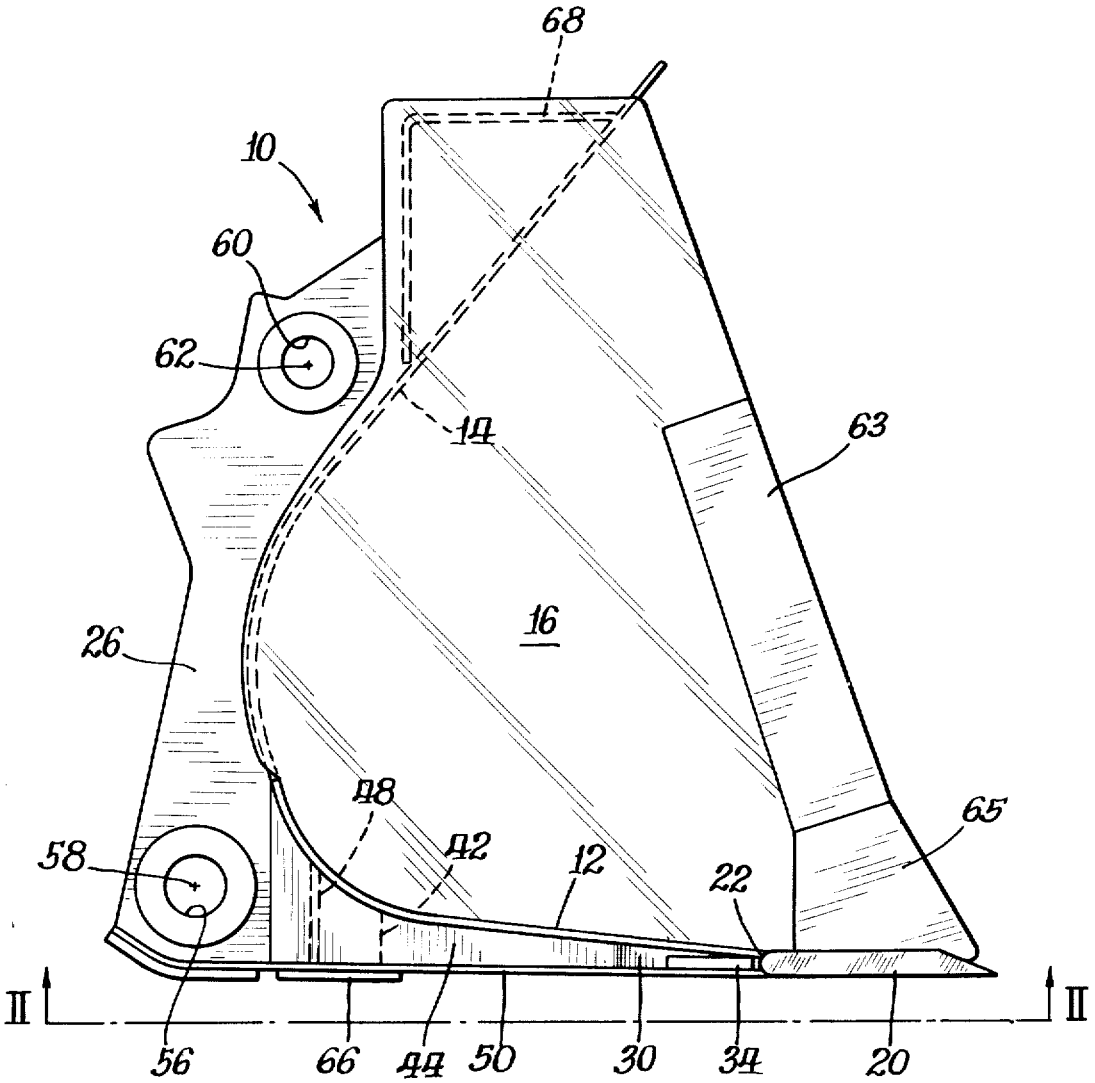
FIG. 1 is a side elevation of a bucket incorporating the inventive reinforcement structure.
Figure 2:
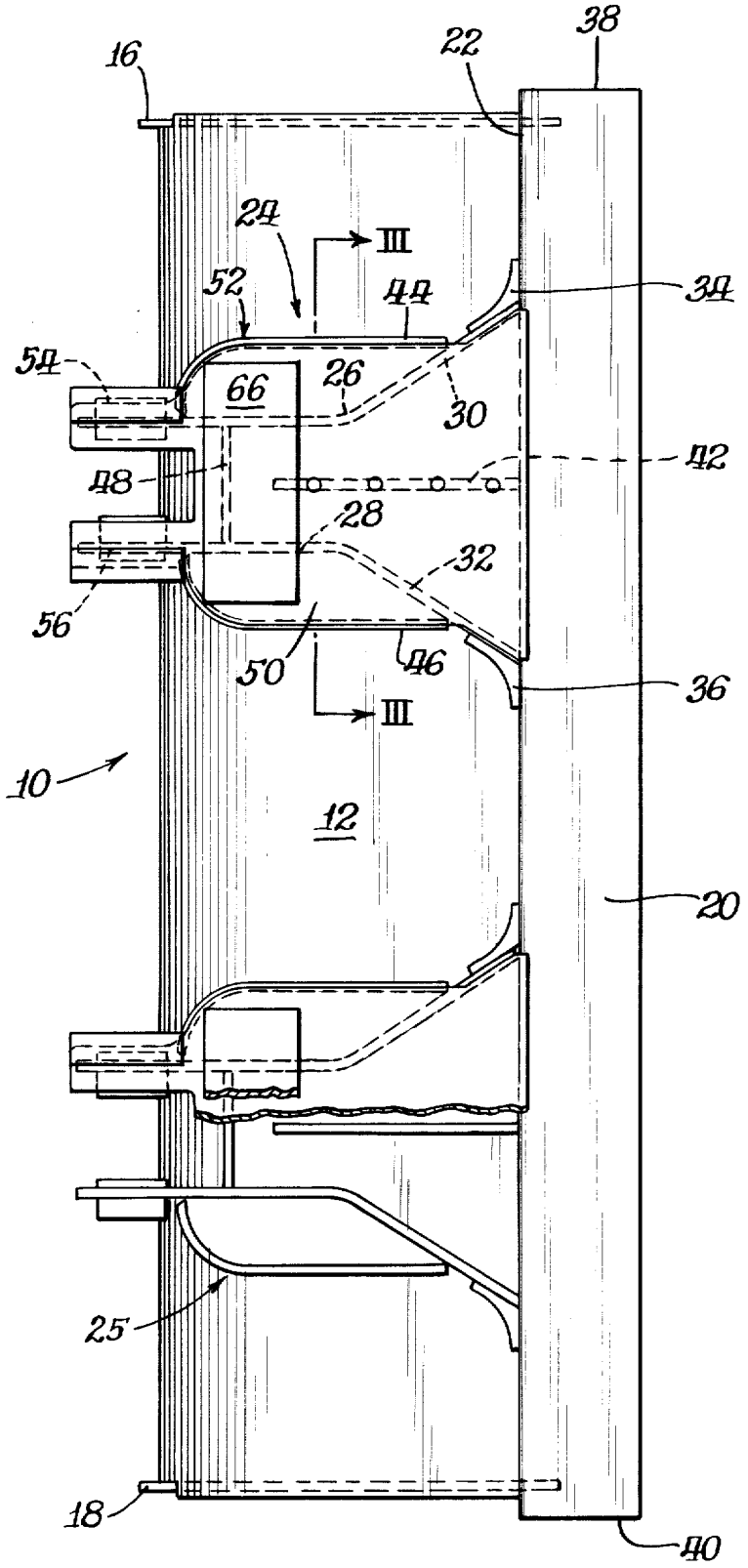
FIG. 2 is a view taken along the line II—II of FIG. 1 and partially broken away.

Shown generally in FIGS. 1 and 2 is the inventive bucket construction 10. Such bucket 10 has a bottom wall portion 12, a rear wall portion 14 adjoining the bottom wall portion 12, and end wall portions 16, 18 between which the bottom wall and rear wall portions 12, 14 extend, end wall portions 12, 14 being fixed thereto. A cutting edge 20 is fixed to and runs along the forward edge 22 of the bottom wall portion 12.

Spaced-apart reinforcement structures 24, 25 are provided for reinforcement purposes. As these structures 24, 25 are identical, only structure 24 will be described in detail. In that structure 24, spaced-apart rib members 26, 28 are fixed, as by welding, externally to the bottom wall portion 12. Such rib members 26, 28, it will be seen, run continuously from the cutting edge 20 to the rear of the bottom wall portion 12. The rib members 26, 28 flare apart at portions 30, 32, in the direction of the cutting edge 20, when proximate to the cutting edge 20. Brace members 34, 36 are disposed outwardly of the rib members 26 and 28 respectively. Such brace members 34, 36 are fixed to the cutting edge 20 by welding, and the brace members 34, 36 are fixed by welding to the flared portions 30, 32 of the rib members 26 and 28 respectively. In such manner, the rib members 26, 28 are fixed relative to the cutting edge 20, and it should be noted that such relative fixing is inward of the ends 38, 40 of the cutting edge 20.

A rib member 42 is fixed to the bottom wall portion 12 externally thereof intermediate the rib members 30, 32, and runs transversely of the cutting edge 20. Rib members 44, 46, run continuously along and are fixed externally to the bottom wall portion 12 outwardly of the rib members 30, 32 respectively. A rib member 48 runs between the rib members 26, 28 generally parallel to the cutting edge 20, and is externally fixed to the bottom wall portion 12.

Figure 3:
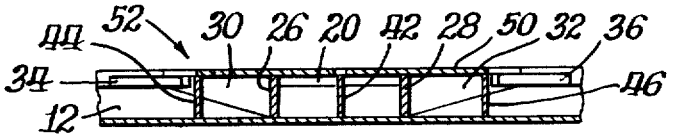
FIG. 3 is a sectional view taken along the line III—III of FIG. 2.

A plate 50 is fixed to the extending edges of the rib members 26, 28, 42, 44, 46, 48, and runs therealong. The plate 50 is also fixed by welding to the cutting edge 20, the plate 50 and rib members 26, 28, 42, 44, 46, 48 together with wall portion 12 form a box section 52 running transversely of the cutting edge 20. The cross-section of such box section 52 is shown in FIG. 3. It is to be pointed out that the box section 52 decreases in height as it approaches the cutting edge 20 (FIG. 1). It has been found that this particular configuration of box section 52 provides an extremely rigid structure.

The rib members 26, 28 extend rearwardly of the bottom wall portion 12 to define a pair of spaced, coaxial apertures 54, 56. The axis 58 of such apertures 54, 56 is generally parallel to the cutting edge 20. The rib members 26, 28, from there, extend upwardly along the rear wall portion 14 to define a second pair of spaced coaxial apertures, as shown at 60, the axis 62 of which is generally parallel to the cutting edge 20.

These apertures, along with like apertures associated with structure 25, provide means for attaching the bucket 10 to a loader linkage (not shown).

Wear plate 63 and corner portion 65 are associated with end wall 16, as shown in FIG. 1. End wall 18 has similar structure associated therewith.

In addition, the reinforcement structure 24 further includes a heel plate 66 fixed to the plate 50, adjacent the apertures 54, 56. An angle member 68 is fixed to the rear wall portion 14 externally thereof and running therealong, generally parallel to the cutting edge 20 between end walls 16, 18.

By providing external box structures which support the cutting edge 20 intermediate its ends 38, 40, the stresses in the bucket shell (including bottom wall portion 12, rear wall portion 14, and end wall portion 16, and particularly the corners thereof), are drastically reduced, so that thinner plates can be utilized in the bucket construction. In fact, it has been found that, while the weight of the inventive construction herein is less than that of conventional bucket constructions, the overall strength of the inventive construction is greater. Consequently, the resulting bucket construction is quite efficient for use, meanwhile being extremely simple and economical in design.

What is claimed is:

1. In a bucket construction having a bottom wall portion, a rear wall portion extending therefrom, a pair of end wall portions between which the rear wall and bottom wall portions extend, and a cutting edge fixed to and running along the forward edge of the bottom wall portion, reinforcement means comprising: first and second rib members spaced apart and fixed externally to the bottom wall portion and running continuously from the cutting edge, and fixed relative thereto, to the rear of the bottom wall portion; and, a plate fixed to the extending edges of the first and second rib members and running therealong, the rib members and plates together forming a box section running transversely of the cutting edge, wherein the plate is fixed to the cutting edge, wherein the reinforcement means further comprise a third rib member fixed to the bottom wall portion externally thereof intermediate the first and second rib members and running transversely of the cutting edge, the plate being fixed to the extending edge of the third rib member, and, wherein the first and second rib members flare apart in the direction of the cutting edge when proximate to the cutting edge.

2. The combination of claim 1 wherein the first and second rib members extend rearwardly of the bottom wall portion to define a pair of spaced coaxial apertures the axis of which is generally parallel to the cuting edge.

3. The combination of claim 2 wherein the first and second rib members further extend upwardly along the rear wall portion to define a second pair of spaced coaxial apertures the axis of which is generally parallel to the cutting edge.

4. In a bucket construction having a bottom wall portion, a rear wall portion extending therefrom, a pair of side wall portions between which the rear wall and bottom wall portions extend, and a cutting edge fixed to and running along the forward edge of the bottom wall portion, a pair of spaced-apart reinforcement structures, each comprising:

a. first and second rib members spaced apart and fixed externally to the bottom wall portion, and fixed relative to the cutting edge inwardly of the ends of the cutting edge, running continuously therefrom to the rear of the bottom wall portion, said first and second rib members flaring apart in the direction of the cutting edge when proximate to the cutting edge;

b. a third rib member fixed to the bottom wall portion externally thereof intermediate the first and second rib members and running transversely of the cutting edge;

c. fourth and fifth rib members running continuously along and externally fixed to the bottom wall portion outwardly of the first and second rib members respectively; and, d. a plate fixed to the extending edges of the first, second, third, fourth and fifth rib members and running therealong, and fixed to the cutting edge, the plate and first, second, third, fourth, and fifth rib members together forming a box section running transversely of the cutting edge.

5. The combination of claim 4 wherein each reinforcement structure further comprises a sixth rib member running generally parallel to the cutting edge between the first and second rib members, and between and fixed to the bottom wall portion and the plate.

6. The combination of claim 5 wherein the first and second rib members extend rearwardly of the bottom wall portion to define a pair of spaced coaxial apertures the axis of which is generally parallel to the cutting edge.

7. The combination of claim 6 wherein the first and second rib members further extend upwardly along the rear wall portion to define a second pair of spaced coaxial apertures the axis of which is generally parallel to the cutting edge.

8. The combination of claim 7 wherein each reinforcement structure further comprises first and second brace members disposed outwardly of the first and second rib members, fixed to the cutting edge, the first and second brace members being fixed to the flared portions of the first and second rib members respectively.

9. The combination of claim 8 wherein the box section decreases in height as it approaches the cutting edge.

10. The combination of claim 9 wherein each reinforcement structure further comprises a heel plate fixed to the first-mentioned plate adjacent the first-mentioned pair of spaced coaxial apertures.

11. The combination of claim 10 further comprising an angle member fixed to the rear wall portion externally thereof and running therealong generally parallel to the cutting edge.

*12. In a bucket construction having a shell defined by a midwall portion and a pair of end wall portions between which the midwall portion transversely extends, and a cutting edge fixed to and running transversely along a forward edge of the midwall portion to define a forwardly open bucket, improved reinforcement means comprising:*

*first and second rectilinear, parallel spaced rib structures fixed in underlying relationship to said midwall portion and extending transversely to said cutting edge;*

*a third rib structure extending transversly between said first and second rib structures to define therewith a generally H-shaped reinforcing means;*

*a bottom plate fixed to and underlying said first, second and third rib structures whereby said rib structues form with the plate a box section; and*

*fourth and fifth rib structues flaring forwardly apart from said first and second rib structures to respectively proximate said cutting edge.*

*13. The bucket construction of claim 12 wherein said first and second rib structures extend forwardly from said third rib structure approximately one-half the forward extent of said fourth and fifth rib structures.*

*14. The bucket construction of claim 12 wherein brace elements are provided at the forward ends of the fourth and fifth rib structures, said brace elements being welded to said fourth and fifth rib structures respectively and said cutting edge.*

*15. The bucket construction of claim 12 wherein a substantially rectilinear rib element is fixed to said plate to extend parallel to said first and second rib structures from a position rearwardly of the forward end of said first and second rectilinear rib structures to proximate said cutting edge.*

*16. The bucket construction of claim 12 wherein a heel plate is fixed to said bottom plate rearwardly of said cutting edge.*

*17. The bucket construction of claim 12 wherein a heel plate is fixed to said bottom plate subjacent said third rib structure.*

*18. The bucket construction of claim 12 wherein said fourth and fifth rib structures extend from the forward ends of said rectilinear first and second rib structures.*

*19. In a bucket construction having a shell defined by a midwall portion and a pair of end wall portions between which the midwall portion transversely extends, and a cutting edge fixed to and running transversely along a forward edge of the midwall portion to define a forwardly open bucket, improved reinforcement means comprising:*

*a generally H-shaped reinforcement underlying said midwall portion having a transverse portion extending parallel to said cutting edge, rectilinear forward legs extending forwardly from said transverse portion toward said cutting edge, and rectilinear rearward legs extending rearwardly from said transverse portion away from said cutting edge;*

*first rib means flaring outwardly from said forward legs respectively to proximate said cutting edge;*

*a bottom plate underlying said H-shaped reinforcement and rib means and secured thereto to said cutting edge to define a box section; and*

*second rib means extending substantially transversely to said cutting edge intermediate said first rib means and fixed to said bottom plate and said bucket bottom wall portion.*

*20. The bucket construction of claim 19 wherein said second rib means comprises a substantially rectilinear rib having a rear end spaced forwardly of said transverse portion of the H-shaped reinforcement.*

*21. The bucket construction of claim 19 wherein a heel plate is fixed to the underside of said bottom plate subjacent said transverse portion of the H-shaped reinforcement.*

*22. The bucket construction of claim 19 wherein brace members are secured to said first rib means and to said cutting edge.*

*23. The bucket construction of claim 19 wherein transversely outwardly extending brace members are secured to said first rib means and to said cutting edge.*

* * * * *

UNITED STATES PATENT AND TRADEMARK OFFICE

CERTIFICATE OF CORRECTION

PATENT NO. : RE. 29,603

DATED : April 4, 1978

INVENTOR(S) : Stanley A. Oke and Robert F. Shankwitz

It is certified that error appears in the above-identified patent and that said Letters Patent are hereby corrected as shown below:

Column 4, line 66, cancel "transversly" and substitute therefor --transversely--.

Column 5, lines 2 and 4, cancel "structues" and substitute therefor --structures--.

Signed and Sealed this

*Third* Day of *October 1978*

[SEAL]

*Attest:*

RUTH C. MASON
*Attesting Officer*

DONALD W. BANNER
*Commissioner of Patents and Trademarks*